No. 705,565. Patented July 29, 1902.
W. H. DYE.
OIL FUEL GENERATOR.
(Application filed July 13, 1901.)
(No Model.)
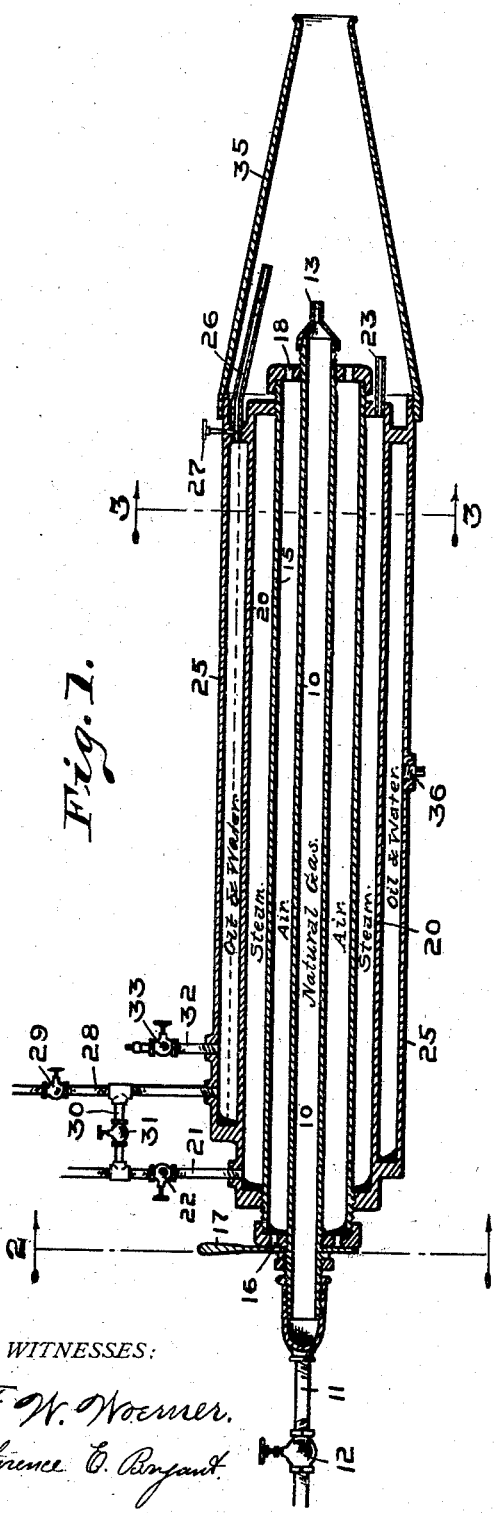
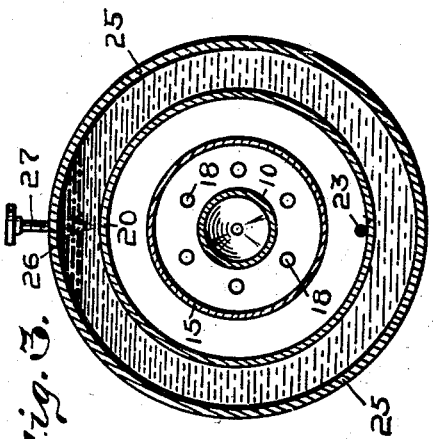
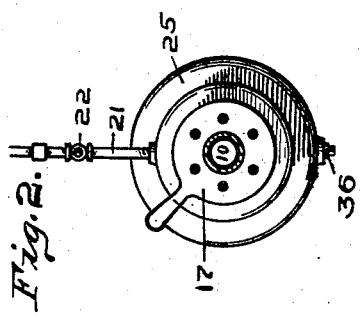
WITNESSES:
INVENTOR.
William H. Dye.
BY V. H. Lockwood
ATTORNEY.

UNITED STATES PATENT OFFICE.

WILLIAM H. DYE, OF INDIANAPOLIS, INDIANA, ASSIGNOR OF ONE-HALF TO JOHN M. WHARTON, OF INDIANAPOLIS, INDIANA.

OIL-FUEL GENERATOR.

SPECIFICATION forming part of Letters Patent No. 705,565, dated July 29, 1902.

Application filed July 13, 1901. Serial No. 68,151. (No model.)

*To all whom it may concern:*

Be it known that I, WILLIAM H. DYE, of Indianapolis, county of Marion, and State of Indiana, have invented a certain new and useful Oil-Fuel Generator; and I do hereby declare that the following is a full, clear, and exact description thereof, reference being had to the accompanying drawings, in which like figures refer to like parts.

The object of this invention is to provide an effective and successful oil-fuel generator which is simple, small, and compact and which will not be gummed or choked by the oil and wherein steam, oil, and air are used and combined and the oil is vaporized, the arrangement being such that before the admixture of the three the steam-chamber will lie adjacent the water-and-oil chamber for heating the water and oil.

One feature of the invention consists in keeping the oil while in the device on a body of water out of contact with the parts of the device above or below it and by maintaining said body of water at a uniform height registering with the oil-outlet. A very thin sheet of oil will be supported on the body of water, which will pass out of the device without contacting with the walls of the chamber, and when the device and the water therein become heated it will be vaporized before it leaves the device. This and the other features of my invention will be understood from the accompanying drawings and the following description and claims.

In the drawings, Figure 1 is a central longitudinal section of the device. Fig. 2 is a cross-section on the line 2 2 of Fig. 1. Fig. 3 is a cross-section on the line 3 3 of Fig. 1.

In the device herein shown for the purpose of illustrating the general purpose of my invention a central pipe 10 forms a natural-gas chamber, to which natural gas is supplied through the supply-pipe 11, and it is controlled by the valve 12. An outlet 13 is provided at the other end. This chamber for the natural gas is not needed where natural gas is not used as a portion of the fuel.

Surrounding the natural-gas chamber and shorter than it I mount the cylinder 15, forming the air-chamber. At the inlet end of said chamber there are inlet-openings 16, which are regulated by the damper 17, that is mounted rotatably in the pipe 10 and adjacent the end plate of the cylinder 15. Suitable outlet-openings 18 are provided at the other end, being a series of holes arranged in a circle.

A steam-chamber is formed by the cylinder 20, that surrounds the cylinder 15 and is closed at the inlet end. It is supplied with steam through the pipe 21, that is controlled by the valve 22. The outlet is at the other end through the small pipe 23, said outlet-opening being at the bottom of the cylinder 20.

The water-and-oil chamber is formed by the cylinder 25, that surrounds the cylinder 20 and is closed at the inlet end. The outlet is through the tube 26, located near the upper part of the chamber. The chamber is filled with water up to the outlet, so that there is always a water-surface in said chamber registering with the outlet. The outlet-opening is controlled by the needle-valve 27. Oil enters said chamber at the top through the pipe 28, which is controlled by the valve 29. Steam is also admitted into the water-and-oil chamber through the pipes 30 and 28. This steam-inlet is controlled by the valve 31. Before sufficient steam has been raised in the boiler heated by means of this burner the burner is started and operated by means of the compressed air entering the top of the water-and-oil chamber from any suitable source of supply through the pipe 32, which is controlled by the valve 33.

The mixing-chamber is formed by the conical nozzle 35, which screws on at its end to the outer cylinder 25. In the series of cylinders and pipes mentioned the inner ones extend at each end somewhat beyond the outer surrounding pipes.

The device is operated in the following manner: Enough water is placed in the water-and-oil tank, which feeds the device, substantially to fill the water-and-oil chamber. Then the valve 29 is opened, whereupon the water enters said chamber first and when full flows out through the pipe 26. When the chamber is filled once with water, no other water need be introduced. The oil in the water-and-oil tank or supply will follow the water and form a layer on top of the water in said chamber.

If no steam be used, the valve 33 is opened to admit compressed air and to drive the oil out through the mixing-chamber, where it is lighted. When sufficient steam-pressure—say ten pounds—is obtained, the valve 33 is closed and the valve 22 is left open. Also the valve 31 is open for introducing more steam directly into the oil. This heats the oil and drives it out through the outlet 26 into the mixing-chamber and through the nozzle. When, however, the heat of the steam in the steam-chamber sufficiently heats the water supporting the oil as to cause the vaporization of the oil, the valve 31 may be closed, but it need not be, as a small quantity of steam may be advantageously passed into the water-and-oil chamber at all times, for it increases the power of the device and the rapidity of the vaporization of the oil. The heat in the steam-chamber will also warm the air in the air-chamber, as the steam-chamber lies between the air-chamber and the water-and-oil chamber. The steam is passed out of the steam-chamber through the opening at the bottom to prevent the collection of condensation-water.

With this device crude oil may be used without difficulty, as the steam heats and vaporizes the oil and the heavy particles sink through the water to the bottom of the chamber. There is a waste-plug 36, closing an opening in the bottom of the water-and-oil chamber to remove the sediment when desired. By floating the oil on the water in a very thin sheet and the water being hot the oil is quickly heated and vaporized, and by maintaining the water-level above the cylinder 20 and below the top of the cylinder 25 the oil is not in contact with the surface of said cylinders, so that there is no opportunity for the oil to gum any part of the device or close it.

What I claim as my invention, and desire to secure by Letters Patent, is—

1. An oil-fuel generator including a steam-chamber, and a water-and-oil chamber into which the steam-chamber extends for heating the contents thereof, the outlet from the water-and-oil chamber being at a higher point than the steam-chamber, whereby the water will envelop the steam-chamber and support the oil above and out of contact with the steam-chamber.

2. An oil-fuel generator including a cylindrical steam-chamber, a cylindrical water-and-oil chamber surrounding the steam-chamber, means for supplying steam to the steam-chamber, means for supplying oil to the water-and-oil chamber at one end, an outlet from the water-and-oil chamber above the steam-chamber at the other end, and an outlet from the steam-chamber at the same end near the bottom.

3. An oil-fuel generator including an air-chamber open at both ends, a steam-chamber surrounding the air-chamber, a water-and-oil chamber surrounding the steam-chamber, means at one end for supplying steam to the steam-chamber and oil to the oil-chamber, an outlet at the other end from the water-and-oil chamber near its top, and an outlet from the steam-chamber near its bottom.

4. An oil-fuel generator consisting of a natural-gas chamber, a pipe leading thereto to supply the same, an air-chamber surrounding the natural-gas chamber and held in place by perforated end caps that screw upon the natural-gas chamber, a steam-chamber surrounding the air-chamber and which screws upon the same at each end and provided with an outlet-opening near its bottom at one end and a steam-inlet opening near its top at the other end, a water-and-oil chamber surrounding the steam-chamber, a steam-pipe and also an oil-pipe entering one end of said chamber near its top, and an outlet-opening at the other end of said chamber at a point above the steam-chamber, and a conical nozzle that screws upon the outlet end of said water-and-oil chamber, substantially as set forth.

In witness whereof I have hereunto affixed my signature in the presence of the witnesses herein named.

WILLIAM H. DYE.

Witnesses:
 FLORENCE E. BRYANT,
 V. H. LOCKWOOD.